July 21, 1959  W. R. CHAPMAN ET AL  2,895,772
PACKING RING
Filed March 31, 1955  2 Sheets-Sheet 1
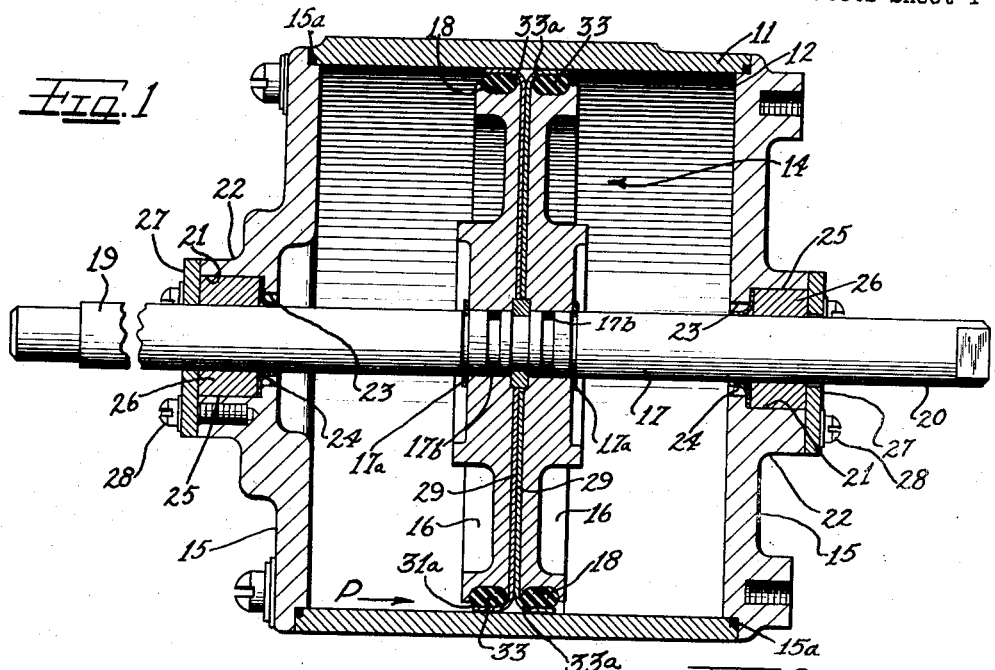
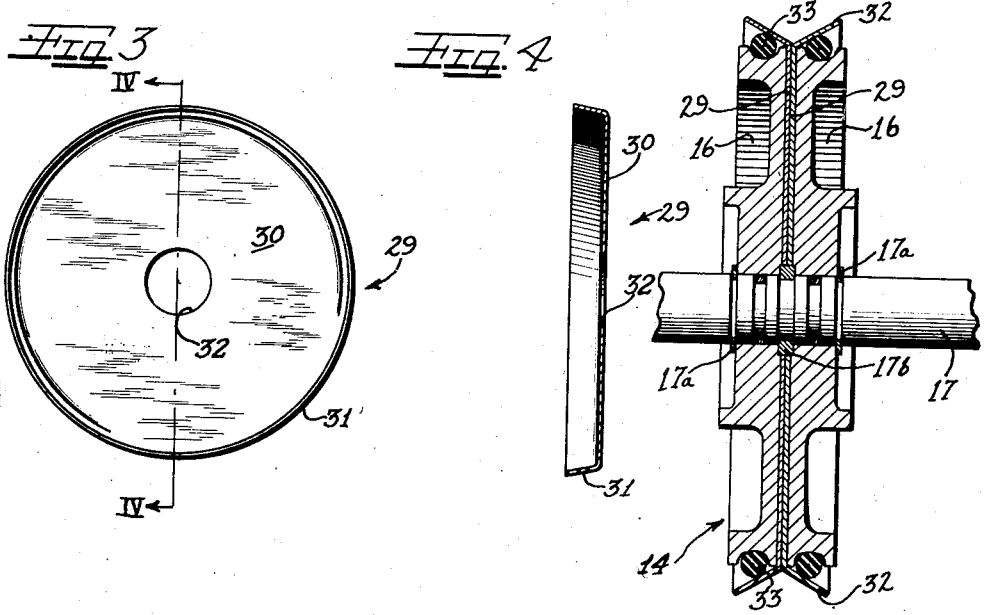
Inventors
WALTER R. CHAPMAN
ALFRED TALAS July 21, 1959 W. R. CHAPMAN ET AL 2,895,772
PACKING RING
Filed March 31, 1955 2 Sheets-Sheet 2
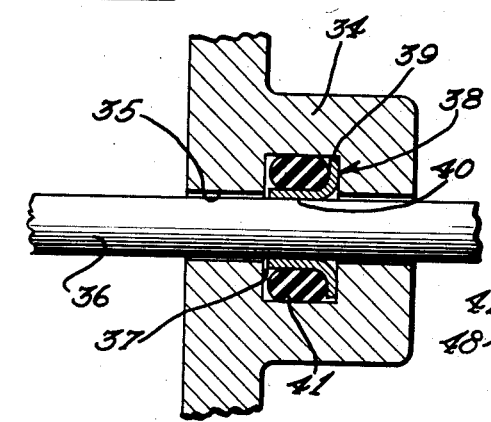
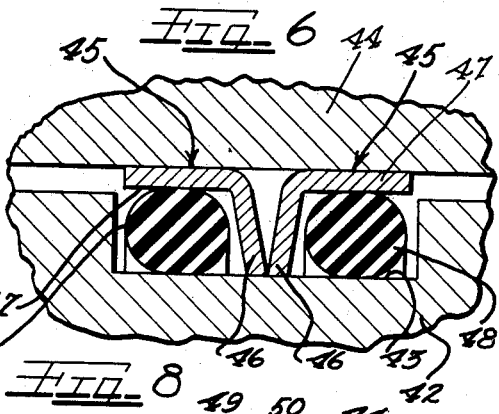
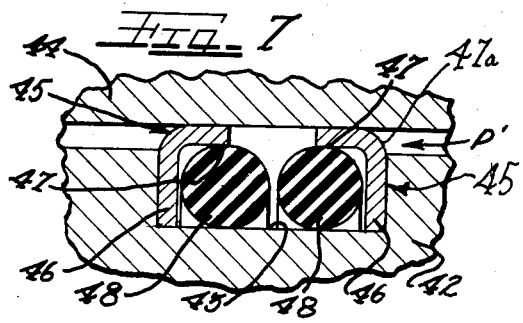
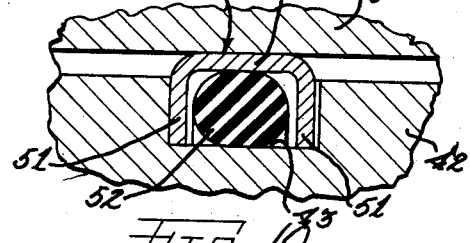
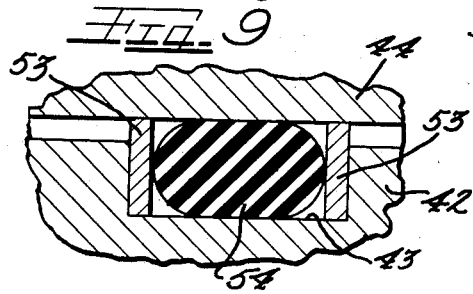
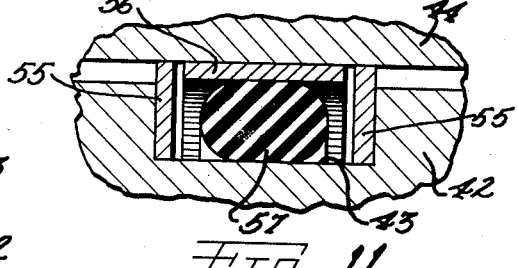
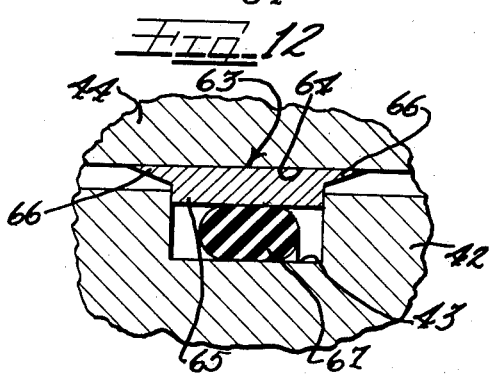
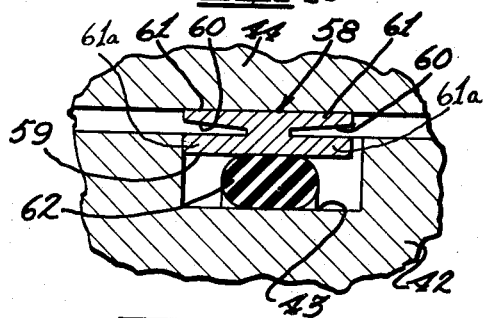
Inventors
WALTER R. CHAPMAN
ALFRED TALAS
By Hill, Sherman, Meroni, Gross & Simpson Attys

United States Patent Office 2,895,772
Patented July 21, 1959

2,895,772

PACKING RING

Walter R. Chapman, Bedford, and Alfred Talas, Cleveland, Ohio, assignors to Thompson Ramo Wooldridge Inc., a corporation of Ohio Application March 31, 1955, Serial No. 498,132

13 Claims. (Cl. 309—23)

The present invention relates to a new and improved fluid seal assembly and more particularly to improved sealing ring or the like structures.

In accordance with the general features of the instant invention there is now provided an improved fluid seal assembly for preventing fluid leak-by between surfaces adapted for movement relative to one another such as between the wall of a cylindrical bore and the outer peripheral surface of a cylindrical member adapted for movement within the bore. The instant invention achieves this prevention of fluid leak-by through the provision of novel fluid seal means comprising first or movable sealing means in the form of at least one generally annular flexible or pliant sealing member having a marginal portion thereof biased into movable fluid-seal engagement with the wall of the cylindrical bore responsive to fluid pressure and having an opposite marginal portion disposed in association with the outer periphery of the cylindrical member, and second sealing means in the form of at least one resilient annulus disposed in association with the outer periphery of the cylindrical member and adapted for cooperative action with the first sealing means to prevent fluid leak-by around the outer periphery of the cylindrical member.

An object, therefore, of the instant invention is the provision of a new and improved fluid seal assembly for preventing fluid leak-by between surfaces adapted for movement relative to one another.

Another object is the provision of a sealing ring, back-up ring, groove liner or the like structure for preventing fluid leak-by between a wall of a cylindrical bore and the outer peripheral surface of a cylindrical member adapted for movement within the bore through the provision of multiple seal means adapted for novel sealing coaction.

A further object is the provision of a fluid seal assembly for preventing fluid leak-by between the wall of a cylindrical bore and a cylindrical member adapted for movement within the bore which comprises at least one generally annular flexible sealing member having a marginal portion thereof in tight movable fluid seal engagement with the wall and having an opposite marginal portion disposed in association with the cylindrical member, and at least one resilient annulus disposed in association with the outer periphery of the cylindrical member adapted to cooperate with the sealing member to prevent fluid leak-by around the outer periphery of the cylindrical member.

Still another object is the provision of a piston and packing ring assembly for preventing blow-by around the piston which comprises at least one generally annular flexible sealing member having a marginal portion thereof biased into tight movable fluid-seal engagement with a surrounding cylindrical wall to provide a moving seal and a resilient annulus disposed in association with the outer periphery of the piston adapted to cooperate with the moving seal to prevent fluid leak-by around the outer peripheral surface of the piston.

Other objects, features and advantages of the present invention will be readily apparent from the following detailed description of certain preferred embodiments thereof taken in conjunction with the accompanying sheets of drawings.

In the drawings:

Figure 1 is a longitudinal vertical sectional view taken through a cylinder and piston assembly, with parts in section and parts in elevation, illustrating one embodiment of the instant packing ring and piston structure;

Figure 2 is a diametric sectional view with parts in elevation and parts in section of the piston and packing ring assembly of Figure 1 when not associated with a cylinder;

Figure 3 is a front elevational view of one of the novel flexible sealing members of the instant invention;

Figure 4 is a cross-sectional view taken substantially on the section line IV—IV of Figure 3;

Figure 5 is a fragmental vertical sectional view, with parts in section and parts in elevation, of apparatus embodying the invention for use in association with and for the prevention of fluid leak-by around the outer periphery of a rotatable shaft carried within a housing;

Figure 6 is an enlarged, fragmentary sectional view of a pair of surfaces adapted for movement relative to one another and showing the provision of another embodiment of the instant fluid seal assembly for preventing fluid leak-by between the surfaces;

Figure 7 is a view similar to Figure 6 showing another embodiment of the invention;

Figure 8 is a view similar to Figure 6 showing another form of the instant fluid seal assembly;

Figure 9 is a view similar to Figure 6 illustrating a prior art device over which the instant invention is an improvement;

Figure 10 is a view similar to Figure 6 illustrating still a further form of the instant novel fluid seal assembly;

Figure 11 illustrates another embodiment of the invention; and

Figure 12 is a view similar to Figure 11 illustrating a modified form thereof.

As shown in the drawings:

By way of illustration the instant invention is shown in one embodiment as provided in association with a piston and cylinder assembly, as shown generally at 10, which has, as its component parts, a cylinder 11 having the inner cylindrical surface or wall thereof, as at 12, defining a cylindrical bore adapted to facilitate axial sliding movement of a piston member, such as 14, therein. The ends of the cylinder 11 are closed by parallel opposed cylindrical end walls or closure plates 15. Resilient annular gaskets 15a are disposed between the cylinder ends and the closure plates 15 to provide a seal against fluid leak-by therebetween.

The piston member 14 includes a pair of spaced, axially opposed pistons or piston heads 16 mounted on a piston rod 17 by means of suitable central apertures formed in the piston 16. Each of the pistons 16 is provided with an annular groove 18 formed by integral shoulders on the outer peripheral surface thereof in open confronting relation to the cylinder wall 12.

The axially opposed spaced pistons 16 are held on the piston rod 17 by means of parallel opposed retaining rings 17a acting against each piston 16 on the outer face thereof circumjacent the rod 17. Fluid leak-by around the piston rod 17 between the outer surface thereof and the inner periphery of the centrally disposed apertures in the pistons 16, through which the rod 17 extends, is prevented by means of resilient sealing annuli in the form of O-rings 17b.

The piston member 14 is adapted for axial sliding or translating and/or rotating movement within the cylinder 11 responsive to pressure applied axially thereto and is adapted to move or be moved by fluid, either pneumatic or hydraulic, in a well known manner. Movement of the piston member 14 within the cylinder 11 is transmitted externally of the cylinder by means of the externally projecting, opposite ends of the piston rod 17, as at 19 and 20, projecting through generally centrally disposed apertures in the form of a stepped bore 21 formed in enlarged boss portions 22 in each of the cylinder end walls 15.

The stepped bore 21 includes an inner, reduced diameter portion 23 having a diameter larger than the diameter of the piston rod 17 and is adapted to receive an annular radially curved piston rod seal 24 therein. The stepped bore 21 also includes an outer enlarged diameter portion 25, having a diameter greater than the diameter of the inner portion 23 and in which is disposed a piston rod bearing 26. An annular closure cap or bearing retainer member 27 encloses the bore 21 externally and is mounted on the outer surface of each of the cylinder end walls 15 circumjacent the piston rod 17 by means of suitable screws or the like 28.

Sealing means are provided for preventing fluid leak-by between the outer peripheral surface of the opposed pistons 16 and the cylinder wall 12. In the embodiment shown in Figures 1–4 such means include first sealing means in the form of a pair of generally annular flexible or pliant sealing members comprising a pair of axially opposed sealing cups 29 disposed interjacent the pistons 16. Each cup 29 includes a circular bottom portion 30 having an inside diameter slightly larger than the outer diameter of the piston 16 and an integral annular side wall 31 formed to project normally radially and axially angularly outwardly from the bottom 30 on the outer or circumferential marginal portion thereof as shown best in Figure 4. A centrally disposed aperture 32 is provided in the bottom 30 of each cup for receiving the piston rod 17.

The sealing cups 29 are preferably formed from a more or less resilient material having good wear characteristics and which is capable of providing a tight fluid seal when in biased sliding contact with a cylinder wall. Materials which are suitable for this purpose include, among others, rubber, leather and passive heat resistant plastics which are nearly inert as possible to materials which may be encountered in the fluid system. Among the latter materials are included various synthetic resins and other plastic-like materials such as polyethylenes, and poly-halogenated ethylenes. A preferred material from which the cups 29 may be produced in "Teflon" (polytetrafluoroethylene) which has good wear characteristics; provides an adequate seal against leak-by when slidingly biased against a cylinder wall; is heat resistant; and, displays the desired amount of fluid seal resilience required for the instant purpose.

If desired, the material from which the cups 29 are formed may be optionally impregnated with a suitable lubricating material for reducing friction between the side wall 31 of the cup and the cylinder wall 12. An example of the use of such lubricant is a cup produced from "Teflon" impregnated with about 10% graphite or the like by weight.

As seen in Figures 1 and 2 the cups 29 are disposed between the spaced pistons 16 so that the respective bottoms 30 of the cups are engaged in flush, back-to-back relationship. The side walls 31 of the cups, which normally project angularly radially and axially outwardly from the bottom 30 (Figures 2 and 4) are compressed down against the outer peripheral surface of the piston 16 when the piston member 14 and the packing ring assembly are disposed within the cylinder 11. This causes each of the annular side walls 31 to overlie the outer periphery of one of the pistons 16. The natural more or less resilient nature of the cup 29 causes the obverse or outer surface of the outer marginal portion of the side wall 31 to be biased against the cylinder wall 12.

The outer marginal portion of the cup side wall or lip 31 acts as a moving seal. When the piston and cylinder assembly 10 is subjected to fluid pressures responsive to movement of the piston rod 17 or in moving the piston rod, the outer marginal portion of the cup side wall 31 is biased into tight moving or sliding fluid-seal engagement with the cylinder wall 12 responsive to such fluid pressure. As shown best in Figure 1, axial fluid pressure will act against the under surface of the cup side wall 31, as shown by the arrow labeled P. The intrinsic more or less resilient nature of the cup side wall 31 will normally bias the side wall outwardly toward the cylinder wall 12. Fluid pressure P, which is exerted substantially equally across the entire outer face of the piston, will tend to follow the path of least resistance, in this case in the direction in which the cup side wall 31 is normally biased, and will exert radially outward biasing pressure on the inner or under surface of the cup side wall 31, as at 31a, thereby to produce a tight moving fluid seal between the outer marginal portion of the cup side wall and the cylinder wall 12.

Second means are provided in association with the outer peripheral surface of each of the pistons 16 for cooperation with the inner marginal portion of the cup side wall 31 to prevent fluid leak-by around the outer periphery of the piston 16. In the embodiment shown in Figures 1–4 such means include a resiliently deformable annulus in the form of an O-ring 33 disposed in each of the grooves 18 formed on the outer periphery of the pistons 16.

The O-rings 33 have a generally circular cross-sectional configuration, and are cross-sectionally dimensioned so as to have a diameter slightly larger than the depth of the groove 18 but less than the width of the groove. To this end each of the grooves 18 is preferably formed to have a width greater than its depth. In this manner the O-ring is adapted to extend normally above the outer peripheral surface of the piston 16 with which it is associated and to exert more or less of a biasing force on the underside of the cup side wall 31 which it underlies, thereby to aid in biasing the obverse side of the side wall 31 into sealing engagement with the cylinder wall 12.

By having the width of the annular groove 18 in which the O-ring 33 is disposed wider than the cross-sectional diameter of the rings, means are provided to allow for axial sliding movement for deformation of the resilient O-ring to accommodate the desired "squeeze."

This axial sliding movement of the O-ring 33 within the groove 18 during piston movement causes the O-ring to be deformed resiliently against the wall on one side of the groove, depending upon the direction of piston movement. This resilient deformation produces a wedging action in which the O-ring is deformed radially outwardly against the bottom of the cup side wall 31 which overlies it.

By thus responding to axial piston movement to produce this wedging action to be deformed resiliently radially outwardly, the O-ring 33 is adapted to cooperate with the inner marginal portion of the cup side wall 31, as at 33a, to provide a seal for preventing fluid leak-by around the outer periphery of the piston 16.

In Figures 5–8 and 10–12 are shown various forms, embodiments and uses of the novel fluid seal assembly of the instant invention.

In Figure 5 the instant fluid seal assembly is shown as adapted for use as a packing or seal assembly in preventing fluid leak-by around the outer periphery of a shaft mounted for rotating movement within a housing. As seen therein an enlarged generally boss-like housing 34 having means defining a cylindrical bore 35 therethrough is adapted to receive a shaft 36 for rotational movement within the bore 35. Means are provided within an annular groove 37 formed in the housing 34 in open communication with the bore 35 for preventing fluid leak-by between the outer periphery of the shaft 36 and the wall of the bore 35. Such means for preventing fluid leak-by include first sealing means in the form of a flexible annular sealing member 38 having a radially extending body portion 39 disposed in the groove 37 and an integral axially extending annular flange portion 40 adapted to overlie the bottom of the groove 37.

The inner marginal portion or the inner peripheral surface of the flange 40 is adapted to be biased radially inwardly against the outer periphery of the rotating shaft 36 to provide a moving fluid seal therearound responsive to fluid pressure.

A resilient annulus in the form of a rubber or the like O-ring 41 is disposed or bottomed in the groove 37 and underlies the annular flange 40 of the seal member 38. The O-ring 41 is adapted to be compressed resiliently radially outwardly responsive to outward biasing of the annular flange 40 by the rotating shaft in opposition to fluid pressure. This radially outward resilient compression or deformation of the O-ring 41 causes it to cooperate resiliently with the outer marginal portion of the seal member 38 in the region of the body portion 39 to prevent fluid leak-by along the wall of the bore 35.

It will thus be apparent from a consideration of the embodiment shown in Figure 5 that the instant fluid seal assembly is adapted to prevent fluid leak-by between surfaces adapted for movement relative to one another whether such movement be translatory, as in a piston and cylinder assembly, or rotary as in a rotating shaft disposed within a housing. It will also be apparent that the moving seal provided by the tight "sliding" engagement of a marginal portion of the flexible moving seal member with a cylinder or the like wall responsive to fluid pressure refers to axial sliding movement as well as rotary sliding movement.

In Figures 6-8 and 10-12 are shown a number of enlarged fragmentary, somewhat diagrammatic views of various embodiments of the instant fluid seal assembly for preventing fluid leak-by between surfaces adapted for movement relative to one another. For the sake of brevity such surfaces are shown in Figures 6-12 as comprising a cylinder or cylindrical bore having a piston or the like cylindrical member disposed therein for axial movement; like parts being designated with like numbers. It will be apparent, however, that the movable surfaces in Figures 6-12 may include other forms, such as a bore in a housing adapted to receive a rotating shaft, or the like, and are not restricted to a piston disposed within a cylinder.

In the embodiment shown in Figure 6 a piston 42 having means defining an annular groove 43 on the outer peripheral surface thereof is disposed for axial sliding movement within a cylindrical bore of a cylinder 44. Means are provided for preventing fluid leak-by between the piston 42 and the cylinder wall. Such means include a pair of generally annular relatively pliable sealing members 45 disposed in the groove 43. Each of the sealing members 45 includes a generally radially extending body portion 46 and an integral axially projecting annular flange portion 47. The sealing members 45 are disposed within the groove 43 so that the radially extending body portion 46 of one sealing member is disposed in general back-to-back relationship with the other. Being thus positioned the annular flange portions 47 of each of the sealing members 45 is adapted to project axially oppositely outwardly from the center of the groove 43. The outer peripheral surface or outer marginal portion of each of the annular flange portions 47 is adapted to be biased into tight sliding fluid-seal engagement with the cylinder wall responsive to fluid pressure.

A pair of resilient O-rings 48 are disposed or bottomed within the groove 43 and so positioned that each of the O-rings directly underlies one of the annular flanges 47. During axial sliding movement of the piston 42 the O-rings 48 are adapted to be deformed wedgingly and resiliently against the bottom and side of the groove 43 and to cooperate with the inner periphery or inner marginal portion of the sealing member body portion 46 to prevent fluid leak-by around the outer periphery of the piston.

In the embodiment shown in Figure 7 the sealing members 45 are substantially similar to those shown in Figure 6. As seen in Figure 7, however, the radially extending seal member body portion 46 of each of the seals 45 is positioned in the groove 43 so that the back surface of the body 46 is in substantially flush engagement with the wall or side of the groove 43. When thus positioned the annular flange portion 47 of each of the seal members 45 is adapted to project axially inwardly toward the center of the groove in confronting relationship to the annular flange on the opposite seal member.

A pair of resilient annuli in the form of rubber or the like O-rings 48 are disposed in the groove 43 so that each of the O-rings will underlie the annular flange 47 on one of the seal members 45.

During axial movement of the piston 42 responsive to fluid pressure each of the O-rings 48 will be deformed resiliently radially outwardly. This outward radial deformation of the O-rings 48 accomplishes at least two results: (1) fluid pressure P' acting against the back of the seal member 45 at the junction of the body portion 46 and the annular flange 47, as at 47a will tend to force the seal member axially inwardly toward the center of the groove 43. The radially outwardly deformed O-ring 48, however, functions in a manner not unlike a cam or the like surface. This camming effect of the O-ring 48 causes the annular flange 47 to be biased or canted radially outwardly into tight sliding fluid-seal engagement with the cylinder wall responsive to fluid pressure. (2) Radially outward deformation of the O-ring 48 causes the same to resiliently cooperate with the inner marginal portion of the seal 45 in the region of the body portion 46 and with the bottom of the groove 43 to provide a fluid seal against fluid leak-by around the outer periphery of the piston 42.

In the embodiment illustrated in Figure 8 movable sealing means are provided in the form of a flexible or pliant, annular, generally inverted U-shaped, channel-like sealing member 49 having a generally axially disposed flat ring-like body portion 50 and parallel opposed spaced radially inwardly projecting integral side flanges 51. The seal member 49 is disposed in the groove 43 so that the inner peripheral marginal portion or free edges of the side flanges 51 are generally engaging the bottom of the groove. The outer marginal or peripheral surface of the ring-like body portion 50 is adapted to engage the wall of the cylinder 44 in tight fluid-seal sliding engagement therewith.

A resilient O-ring 52 is disposed within the groove 43 intermediate the side flanges 51 and underlying the ring-like body portion 50.

During axial sliding movement of the piston 42 responsive to fluid pressure the O-ring 52 acts as a cam when wedgingly deformed radially outwardly which, in conjunction with axial fluid pressure, causes the ring-like body portion 50 of the seal member 49 to be biased into tight moving fluid seal engagement with the cylinder wall in a manner similar to that described under Figure 7.

As in the other embodiments of this invention the O-ring 52 is adapted, through resilient deformation to cooperate with the inner marginal portion of the moving or sliding seal member 49 to prevent fluid leak-by around the outer periphery of the piston 42.

In the embodiment shown in Figure 10 moving sealing means for slidably engaging the cylinder wall are provided in the form of three separate annular sealing or seal members. Two of the three seal members comprise a pair of generally annular, radially extending back-up washers 55. Each of the washers 55 has the inner peripheral surface or inner circumferential margin thereof bottomed in the groove 43 with the axial outer face of each washer engaging a side of the groove in general face-to-face contact therewith so that the washers 55 are in parallel spaced opposed relation to one another.

The third seal member comprises an annular, flat, axially extending, generally ring-like seal member 56 disposed intermediate the washers 55 and having the outer marginal portion or outer peripheral surface thereof preferably in face-to-face contact with the wall of the surrounding cylinder 44.

A resilient O-ring 57 is disposed in the groove 43 to underlie the seal member 56 intermediate the washers 55.

During axial movement of the piston 42 radially outward wedging deformation of the O-ring 57 not only tends to enhance the sliding seal between the outer circumferential edge portions of the washers 55 with the cylinder wall, but also increases the biasing action of the seal member 56 against the wall.

The seal member 56, in addition to providing a moving seal, also presents an improved wear surface for the O-ring 57 as compared to having the O-ring in direct rubbing contact with a steel or the like surrounding cylinder wall. As is apparent the wear surface provided by the inner periphery of the seal member 56 materially reduces the incidence of O-ring wear due to frictional rubbing engagement with a cylinder wall.

As has been brought out in discussing the other embodiments of the instant fluid seal assembly the O-ring 57 in Figure 10 is also adapted to cooperate with the washers 55 through resilient wedging deformation to provide a fluid seal against blow-by around the outer peripheral surface of the piston 42.

In Figure 11 the moving seal assumes the form of an annular, flat, axially extending ring-like seal member 58 in which the outer marginal portion or outer peripheral surface is adapted to be biased into tight fluid seal sliding engagement with a surrounding wall and in which the inner peripheral marginal portion, as at 59, is adapted to be received within the confines of the side walls of the groove 43.

Means are provided on the seal member 58 for enhancing radially outward biasing movement of the seal responsive to fluid pressure, thereby to improve the tightness of the sliding fluid seal with a surrounding cylinder wall during piston movement. In the embodiment shown in Figure 11 such means include an annular axially inwardly extending, tapered, generally V-shaped, wedge-like recess 60 formed in both faces of the seal member on either side thereof. The upper and lower leg portions 61 and 61a, respectively, which define the V-shaped recess 60 will tend to be biased radially apart when subjected to inward axial fluid pressure. When this occurs the upper leg 61 will be biased radially outwardly so that the outer peripheral surface thereof will be held in tight sliding sealed engagement with the surrounding cylinder wall in a much more efficient manner than would be realized if the recesses 60 were not provided.

A resilient annulus in the form of a rubber or the like O-ring 62 is disposed in the groove 43 to underlie the seal member 58. During axial movement of the piston 42 within the cylinder 44 the O-ring 62 is wedgingly deformed resiliently radially outwardly against the undersurface or inner peripheral surface of the seal member 58, and likewise, exerts greater resilient pressure against the bottom of the groove 43. In this manner the O-ring 62 is adapted to cooperate with the inner marginal portion of the seal member 58 to prevent fluid leak-by around the outer peripheral surface of the piston 42.

In addition to its fluid seal function the inner peripheral surface of the seal member 58 also provides an improved wear surface for the O-ring 62, as described previously.

In the embodiment shown in Figure 12 moving sealing means are provided similar to those of Figure 11. In Figure 12 such moving sealing means comprise an annular, flat, axially extending, ring-like seal member 63 having an outer peripheral marginal portion 64 axially dimensioned to span a width somewhat greater than the width of the groove 43 and to have the outer surface thereof biased into sliding fluid seal contact with the surrounding wall of the cylinder 44. The inner circumferential marginal portion 65 of the seal member 63, on the other hand, is preferably axially dimensioned to have a width just slightly smaller than the width of the groove 43 and to be received and retained therein by the side walls thereof for limited axial movement.

Means for permitting radially outward biasing of the seal member 63 responsive to fluid pressure are provided integral with the sealing member. As seen in Figure 12 such means include an annular, radially and axially outwardly tapering shoulder 66 which integrally joins the outer circumferential marginal portion 64 and the inner circumferential margin 65 on either side of the seal member 63. The tapered configuration of the shoulders 66 permit fluid pressures, during piston movement, to act on the radial inner face or undersurface thereof so as to bias the outer peripheral margin thereof into tight sliding fluid seal engagement with the surrounding cylinder wall.

A resilient O-ring 67 is disposed within the groove 43 to underlie the annular seal member 63. The O-ring 67 is adapted to be deformed wedgingly during piston movement to cooperate with the inner peripheral surface of the seal member 63 to provide a seal against fluid leak-by around the outer peripheral surface of the piston 42 in the same manner as discussed in Figure 12. Likewise, the inner peripheral surface of the seal member 63 also provides an improved wear surface for the O-ring 67.

Figure 9 represents an O-ring 54 carried in a groove 43 of a piston 42 received in the bore of a cylinder 44. In addition, a Teflon backup washer 53 has been provided on each side of the O-ring 54 within the groove 43. This structure has previously been used by others to reduce the susceptibility of the O-ring to spiral failure. This figure emphasizes how the invention disclosed herein and shown in the other figures precludes engagement by the O-ring with the cylinder wall, an engagement which is considered to be a factor in spiral failures.

By means of the instant fluid seal assembly it is now possible to effect a tighter seal between two surfaces adapted for movement relative to one another than has been possible with the use of O-rings or sliding seals, alone, as employed heretofore. In addition, the flexible or pliant nature of the instant more or less resilient annular movable sealing members for engaging a cylinder or the like wall reduces scoring and wear of cylinder walls to a substantially negligible minimum as opposed to metal or the like rings as have not uncommonly been used in the past.

The instant provision of resilient moving seals in association with one or more O-rings produces a fluid seal greatly superior to seals achieved heretofore employing resilient O-rings alone. In the instant assembly one marginal portion of the flexible annular moving seal member engages a cylinder wall to provide a sliding fluid seal. The resilient O-rings, on the other hand, are adapted to be disposed in association with the outer peripheral surface of a cylindrical member, such as a piston, and to cooperate with the inner marginal portion of the moving seal and the cylindrical member to prevent fluid leak-by therebetween. In addition, the O-rings aid to some extent in biasing the annular flexible moving seal into moving fluid-seal engagement with a surrounding cylinder wall. In this manner not only is the efficiency of the fluid seal increased materially as opposed to using either a flexible moving seal or the O-ring, alone, but moreover the inner peripheral surface of the flexible moving seal, as in Figures 1–8 and 10–12, also provides an improved wearing surface for the O-ring which significantly reduces wear of the ring as compared to having the O-ring in direct sliding contact with a metal cylinder wall or the like surface.

It will be understood that modifications and variations may be effected without departing from the scope of the novel concepts of the present invention.

We claim as our invention:

1. In a fluid seal assembly for preventing fluid leak-by between the wall of a cylindrical bore and a cylindrical member having an annular groove formed on the periphery thereof adapted for movement within said bore, at least one generally annular relatively pliable sealing member carried by and movable with said cylindrical member, said sealing member including a radially extending body portion and an integral normally angularly projecting annular flange portion, said annular flange portion being adapted to overlie at least a portion of said groove and to be biased radially outwardly against said wall in tight sliding fluid-seal engagement therewith responsive to fluid pressure, and at least one resilient annulus disposed within said groove adapted to underlie said annular flange portion and to cooperate with said sealing member to prevent fluid leak-by around the outer periphery of said cylindrical member.

2. In a fluid seal assembly for preventing fluid leak-by between the wall of a cylindrical bore and a cylindrical member having an annular groove formed on the periphery thereof adapted for movement within said bore, a pair of generally annular relatively pliable sealing members carried by and movable with said cylindrical member, said sealing members being formed of plastic such as polytetrafluorethylene each of said sealing members including a radially extending body portion and an integral normally angularly projecting annular flange portion, each of said annular flange portions being adapted to project in axially opposite directions to overlie at least a portion of said groove and to be biased radially outwardly against said wall in tight sliding fluid-seal engagement therewith responsive to fluid pressure, and a resilient annulus disposed within said groove, said annulus being adapted to underlie the annular flange portion of one of said sealing members and to cooperate with said sealing member in preventing fluid leak-by around the outer periphery of said cylindrical member.

3. In a fluid seal assembly for preventing fluid leak-by between the wall of a cylindrical bore and a cylindrical member having an annular groove formed on the periphery thereof adapted for movement within said bore, an annular relatively pliable sealing member having a generally inverted U-shaped cross-sectional configuration disposed in said groove, said sealing member including a ring-like body portion having integral radially inwardly extending parallel spaced flange portions on the sides thereof adapted to be received within said groove, said body portion being adapted to have the outer peripheral surface thereof biased into sliding fluid-seal engagement with said wall, and a resilient annulus disposed within said groove to underlie said body portion intermediate said flange portions and adapted to cooperate therewith to prevent fluid leak-by around the outer periphery of said cylindrical member.

4. In a fluid seal assembly for preventing fluid leak-by between the wall of a cylindrical bore and a cylindrical member having an annular groove formed on the periphery thereof adapted for movement within said bore, a pair of parallel spaced radially extending fluid seal washers disposed within said groove, each of said washers having the outer circumferential margin thereof in tight sliding fluid-seal engagement with said wall, an annular sealing ring having the outer peripheral surface thereof in sliding fluid-seal contact with said wall intermediate said washers, and a resilient annulus disposed within said groove underlying said sealing ring intermediate said washers adapted for coaction therewith in preventing fluid leak-by around the outer periphery of said cylindrical member.

5. A piston and packing ring assembly comprising a pair of spaced pistons adapted for sliding movement within a cylinder, sealing means disposed between the pistons having annular flange portions normally tending to project outwardly at an angle to the axis of said cylinder and adapted to project axially outwardly therefrom circumjacent thereto for sliding fluid-seal engagement with a surrounding cylinder wall responsive to fluid pressure, said sealing means being formed of polyfluoroethylene and resilient annuli adapted to underlie the axially projecting sealing means to prevent fluid leak-by between said means and the outer periphery of said pistons.

6. A piston and packing ring assembly comprising a pair of spaced axially opposed pistons each having an annular groove formed on the outer peripheral surface thereof adapted for sliding movement within a cylinder, a pair of axially opposed sealing cups disposed between the pistons each having the circumferential marginal portion thereof normally tending to project outwardly at an angle to the axis of said piston and adapted to project axially outwardly therefrom to overlie the annular groove in one of said pistons, said cups being formed of flexible deformable plastic such as polytetrafluorethylene and the like, each of said cup marginal portions being adapted to be biased into tight sliding fluid-seal engagement with a cylinder wall responsive to fluid pressure, and a resiliently deformable annulus disposed in each of said annular grooves underlying one of the cup marginal portions adapted to cooperate with the piston and the overlying cup to prevent fluid leak-by therebetween.

7. In a piston and packing ring assembly including a pair of spaced axially opposed pistons each having an annular groove formed on the outer periphery thereof adapted for sliding movement within a cylinder and a resiliently deformable annulus disposed in each of said annular grooves, the improvement which comprises providing a pair of axially opposed sealing cups disposed between the pistons each of said cups having the circumferential marginal portion thereof normally tending to project outwardly at an angle to the axes of said pistons and adapted to project axially oppositely outwardly therefrom to overlie the annular groove in one of said pistons and adapted to be biased into sliding sealing contact with a surrounding cylinder wall responsive to fluid pressure, said circumferential marginal portion being adapted to provide a wear-surface for the annulus it overlies and to cooperate therewith to prevent fluid leak-by around the outer peripheral surface of the piston.

8. In a piston and seal assembly including a metal piston having an annular groove of fixed axial length defined by a pair of spaced integral shoulders disposed on the outer periphery thereof and adapted for sliding movement within a metal cylinder, and a resiliently deformable O-ring disposed in the annular groove and axially movable therein during piston reciprocation, the improvement which comprises a deformable polyfluoroethylene sealing member carried by and movable with the piston and having a circumferentially continuously extending portion extending both intermediate said O-ring and the cylinder and substantially fully overlying the O-ring and also extending axially intermediate of and for engagement with the O-ring and one of the groove-defining shoulders, and adapted to be biased into sealing relation with both the cylinder and said one shoulder in response to fluid pressure, said sealing member being adapted to provide a wear-surface for the O-ring it overlies and to prevent the O-ring from engaging the cylinder wall and said one shoulder, and to cooperate with the O-ring and the piston to prevent fluid leak-by around the outer peripheral surface of the piston.

9. In a fluid seal assembly for preventing fluid leak-by between the wall of a cylindrical bore and a cylindrical member having an annular groove formed on the periphery thereof adapted for movement within the bore, a generally annular relatively pliable sealing member carried by and movable with the cylindrical member, said sealing member being formed of plastic such as polytetrafluoroethylene, said sealing member including a radially extending body portion and an integral normally angularly projecting annular flange portion, said flange portion being adapted to project in an axial direction to overlie at least a portion of said groove and to be biased radially outwardly against the wall in tight sliding fluid-seal engagement therewith responsive to fluid pressure, and a resilient annulus disposed within said groove, said annulus being adapted to underlie the annular flange portion of said sealing member and to cooperate with said sealing member in preventing fluid leak-by around the outer periphery of the cylindrical member.

10. In a packing ring assembly for a piston member adapted for sliding movement in the bore of a cylinder member, one of said members having an annular groove of fixed axial length disposed adjacent to the other member and defined by a pair of spaced integral shoulders, and a resiliently deformable O-ring disposed in the annular groove of said one member and axially movable therein during piston movement, the improvement which comprises a deformable polyfluoroethylene seal carried in said groove and having a circumferentially continuously extending portion extending both intermediate said O-ring and the other of said members and substantially fully overlying the O-ring and also extending axially intermediate of and for engagement with the O-ring and one of the groove-defining shoulders and adapted to be biased into sealing relation with both said other of said members and said one shoulder in response to fluid pressure, said seal being adapted to provide a wear surface for the O-ring it overlies and to prevent the O-ring from engaging said other of said members and said one shoulder, and to cooperate with the O-ring and said one member to prevent fluid leak-by between said members.

11. In a fluid seal assembly for preventing fluid leak-by between the wall of a cylindrical bore and a cylindrical member adapted for relative movement within said bore, one of said wall and cylindrical member having an annular groove formed thereon and opening toward the other, at least one generally annular relatively pliable sealing member carried by and movable with said one of said wall and cylindrical member, said sealing member including a radially extending body portion and an integral normally angularly projecting annular flange portion, said annular flange portion being adapted to overlie at least a portion of said groove and to be biased radially against said other of said wall and cylindrical member in tight sliding fluid-seal engagement therewith responsive to fluid pressure, and at least one resilient annulus disposed within said groove adapted to underlie said annular flange portion and to cooperate with said sealing member to prevent fluid leak-by between said cylindrical member and said wall.

12. In a fluid seal assembly for preventing fluid leak-by between the wall of a cylindrical bore and a cylindrical member having an annular groove formed on the periphery thereof adapted for movement within said bore, a pair of generally annular relatively pliable sealing members carried by and movable with said cylindrical member, said sealing members being formed of plastic such as polyfluoroethylene, each of said sealing members including a radially extending body portion and an integral normally angularly projecting flange portion, said radially extending body portion of each of said sealing members being disposed immediately axially adjacent to each other, each of said annular flange portions being adapted to project in axially opposite directions to overlie at least a portion of said groove and to be biased radially outwardly against said wall in tight sliding fluid-seal engagement therewith responsive to fluid pressure, and a resilient annulus for each of said sealing members and disposed within said groove, said annulus being adapted to underlie the annular flange portion of one of said sealing members and to cooperate with said sealing member in preventing fluid leak-by around the outer periphery of said cylindrical member.

13. In a fluid seal assembly for preventing fluid leak-by between the wall of a cylindrical bore and a cylindrical member having an annular groove formed on the periphery thereof adapted for movement within said bore, a pair of generally annular relatively pliable sealing members carried by and movable with said cylindrical member, said sealing members being formed of plastic such as polyfluoroethylene, each of said sealing members including a radially extending body portion and an integral normally angularly projecting annular flange portion, each of said annular flange portions being adapted to project in axially opposite directions to overlie at least a portion of said groove and to be biased radially outwardly against said wall in tight sliding fluid-seal engagement therewith responsive to fluid pressure, and a resilient annulus for each of said sealing members and disposed within said groove intermediate the radially extending body portions of each of said sealing members, said annulus being adapted to underlie the annular flange portion of one of said sealing members and to cooperate with said sealing member in preventing fluid leak-by around the outer periphery of said cylindrical member.

References Cited in the file of this patent

UNITED STATES PATENTS

| Re. 24,440 | Groen | Mar. 4, 1958 |
| 1,215,445 | Waller | Feb. 13, 1917 |
| 1,273,737 | Christenson | July 23, 1918 |
| 2,456,356 | Aber | Dec. 14, 1948 |
| 2,615,763 | Walford | Oct. 28, 1952 |
| 2,658,809 | Schultz | Nov. 10, 1953 |
| 2,705,177 | Waring | Mar. 29, 1955 |
| 2,708,573 | Rovoldt | May 17, 1955 |
| 2,728,620 | Krueger | Dec. 27, 1955 |
| 2,747,954 | Damm et al. | May 29, 1956 |

FOREIGN PATENTS

| 224,101 | Great Britain | Nov. 6, 1924 |